US010150515B1

(12) United States Patent
Stojkovic et al.

(10) Patent No.: US 10,150,515 B1
(45) Date of Patent: Dec. 11, 2018

(54) MODULAR TRUCK BED FLOOR

(71) Applicant: FORD GLOBAL TECHNOLOGIES, LLC, Dearborn, MI (US)

(72) Inventors: Dragan B. Stojkovic, Taylor, MI (US); Joshua Robert Hemphill, White Lake, MI (US); Jack Marchlewski, Saline, MI (US); Jeffrey Gray, Dearborn, MI (US); Vincent Anthony Chimento, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/600,266

(22) Filed: May 19, 2017

(51) Int. Cl.
*B62D 25/20* (2006.01)
*B60N 3/04* (2006.01)

(52) U.S. Cl.
CPC ......... *B62D 25/2072* (2013.01); *B60N 3/048* (2013.01); *B62D 25/20* (2013.01); *B62D 25/2009* (2013.01)

(58) Field of Classification Search
CPC ................ B62D 25/2072; B62D 25/25; B62D 25/2009; B60N 3/048
USPC ....................................................... 296/183.1
See application file for complete search history.

(56) References Cited

U.S. PATENT DOCUMENTS

| | | | | |
|---|---|---|---|---|
| 1,913,342 A | * | 6/1933 | Schaffert | E04D 3/30 |
| | | | | 105/422 |
| 2,907,417 A | * | 10/1959 | Doerr | B61D 17/10 |
| | | | | 105/422 |
| 3,080,021 A | * | 3/1963 | Muir | E04B 5/10 |
| | | | | 105/422 |
| 3,269,072 A | * | 8/1966 | Black | B61D 17/10 |
| | | | | 105/422 |
| 3,909,059 A | * | 9/1975 | Benninger | B62D 25/2054 |
| | | | | 105/422 |
| 4,186,537 A | | 2/1980 | Mountz | |
| 4,951,992 A | * | 8/1990 | Hockney | B62D 25/2054 |
| | | | | 105/422 |
| 5,351,990 A | * | 10/1994 | Thomas | B62D 25/2054 |
| | | | | 280/789 |
| 5,403,062 A | * | 4/1995 | Sjostedt | B62D 33/046 |
| | | | | 220/1.5 |

(Continued)

FOREIGN PATENT DOCUMENTS

DE 102011118047 A1 * 5/2013 ......... B62D 25/2072

*Primary Examiner* — Hilary L Gutman
(74) *Attorney, Agent, or Firm* — Jason Rogers; Brooks Kushman P.C.

(57) ABSTRACT

A pick-up truck bed includes a plurality of plates longer in a longitudinal direction than in a transverse direction that are assembled together along longitudinally extending edges to a laterally adjacent one of the plates. The plates each include a plurality of supporting structures longitudinally extending along a length of the plates that support the plates on transversely extending cross-members. A left-side plate defines a left wheel housing cutout, a longitudinally extending central plate includes first and second complementary interlocking features on opposite longitudinally extending sides, and a longitudinally extending right-side plate defines a right wheel housing cutout. The left-side plate includes a first interlocking feature and the right-side plate includes a second interlocking feature that each receive one of the complementary interlocking features of the central plate.

5 Claims, 4 Drawing Sheets

(56) References Cited

U.S. PATENT DOCUMENTS

| | | | | |
|---|---|---|---|---|
| 5,660,427 | A * | 8/1997 | Freeman | B62D 29/001 |
| | | | | 296/183.1 |
| 6,023,806 | A * | 2/2000 | Dumlao | B63B 5/00 |
| | | | | 14/73 |
| 6,439,649 | B1 * | 8/2002 | Lorenzo | B62D 29/043 |
| | | | | 296/181.3 |
| 6,871,904 | B2 * | 3/2005 | Bhat | B62D 25/2054 |
| | | | | 296/183.1 |
| 7,152,911 | B1 * | 12/2006 | McNulty | B62D 25/2054 |
| | | | | 296/184.1 |
| 7,290,827 | B2 * | 11/2007 | McNulty | B62D 33/02 |
| | | | | 296/181.4 |
| 7,517,005 | B2 | 4/2009 | Kuriakose | |
| 7,575,264 | B1 * | 8/2009 | Solomon | B60P 7/0815 |
| | | | | 296/183.1 |
| 7,703,208 | B2 * | 4/2010 | McNulty | B62D 25/2054 |
| | | | | 29/417 |
| 7,731,271 | B2 * | 6/2010 | Shelbo | B21D 13/045 |
| | | | | 296/182.1 |
| 8,506,005 | B2 | 8/2013 | Balaz et al. | |
| 8,696,048 | B2 * | 4/2014 | Griffin | B62D 25/2054 |
| | | | | 296/184.1 |
| 8,745,871 | B2 | 6/2014 | Booher | |
| 9,650,003 | B2 * | 5/2017 | Owens | B60R 19/023 |
| 9,796,311 | B2 * | 10/2017 | Veik | B60N 3/046 |
| 2004/0262950 | A1 * | 12/2004 | Bhat | B62D 25/2054 |
| | | | | 296/183.1 |
| 2006/0087152 | A1 * | 4/2006 | Kuriakose | B62D 25/2054 |
| | | | | 296/184.1 |
| 2008/0001430 | A1 * | 1/2008 | Booher | B21C 23/145 |
| | | | | 296/184.1 |

* cited by examiner

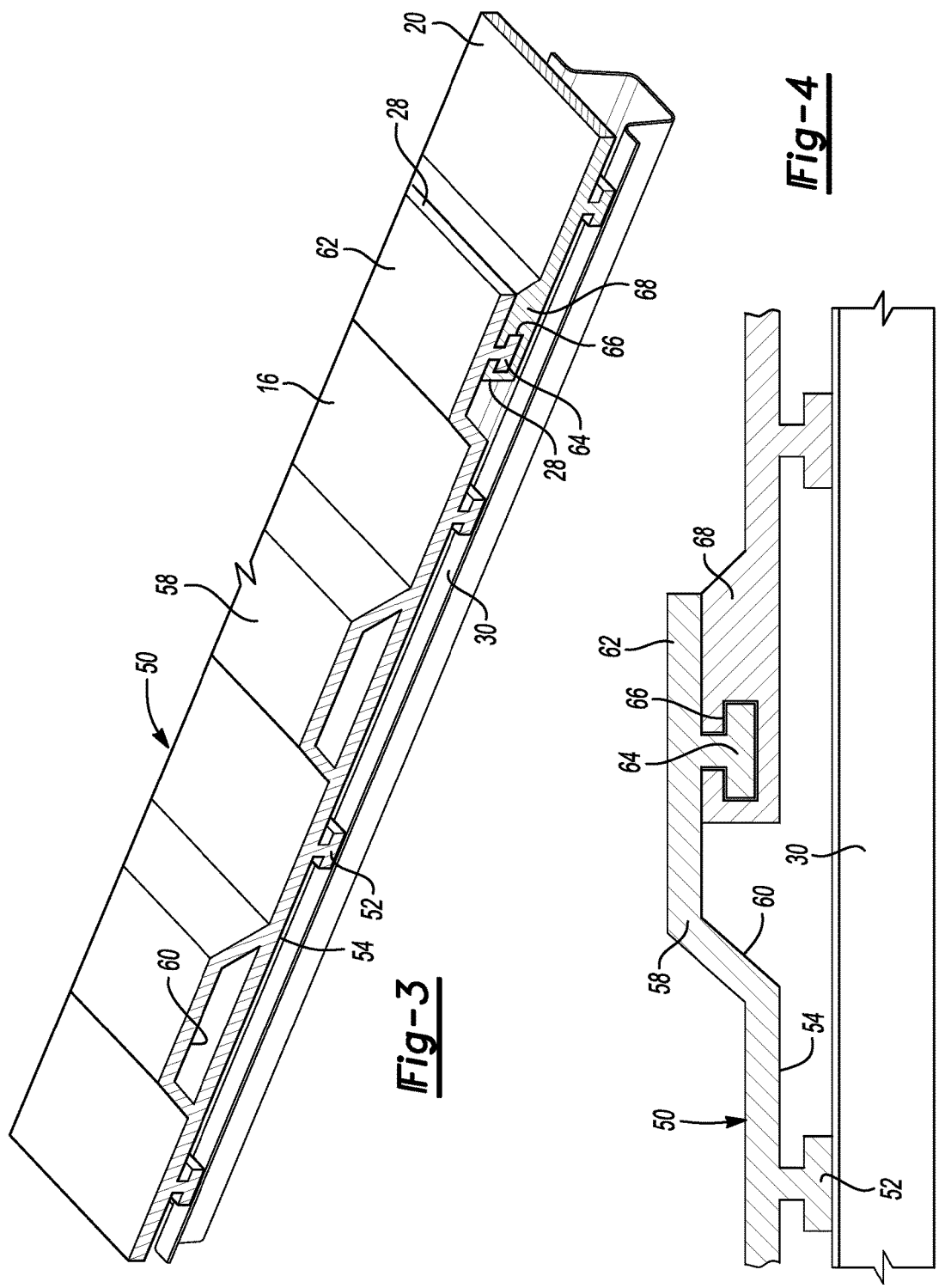

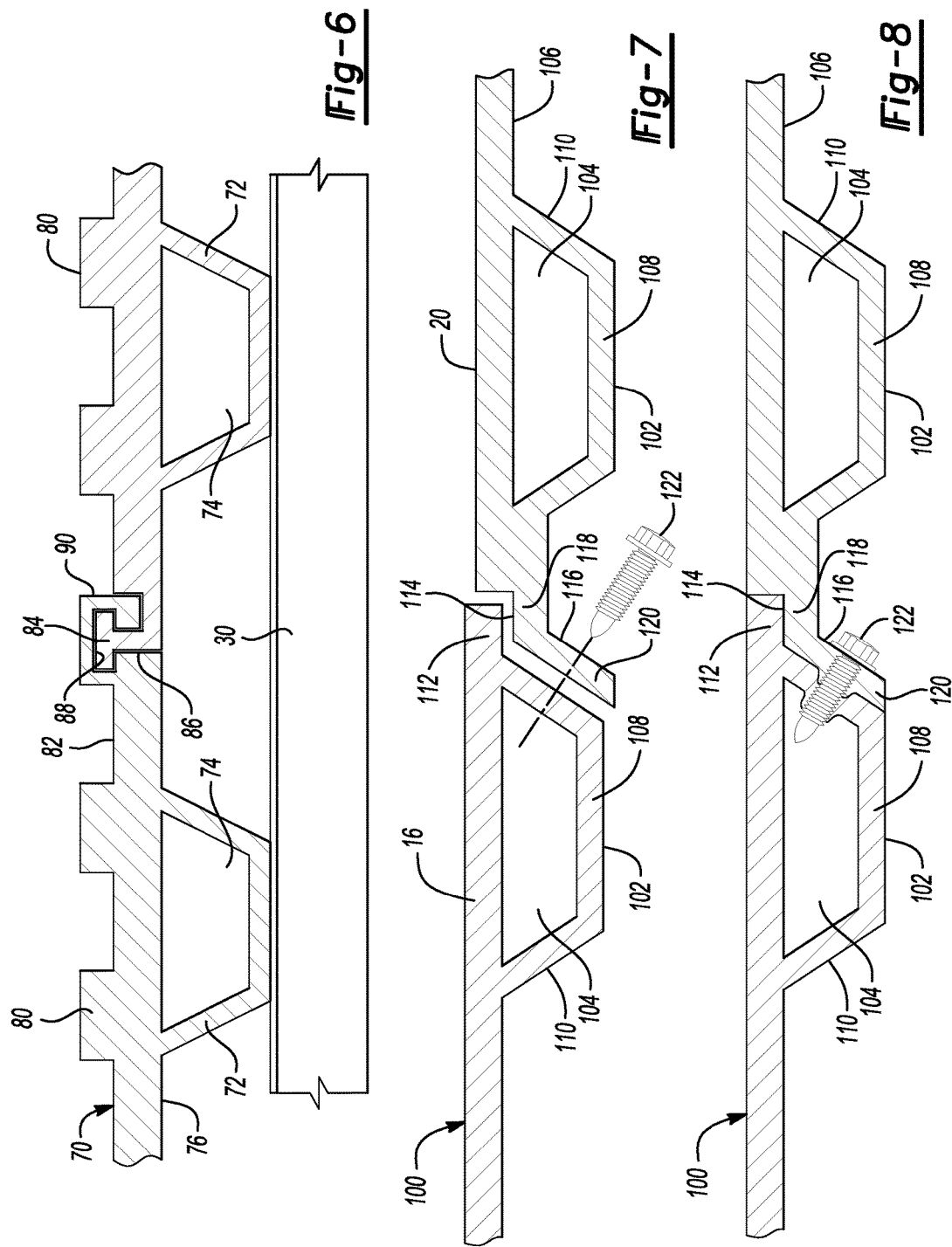

MODULAR TRUCK BED FLOOR

TECHNICAL FIELD

This disclosure relates to a pick-up truck bed floor that includes a plurality of extruded sections assembled together at longitudinally extending edges.

BACKGROUND

Pick-up trucks include a bed that may be utilized for transporting a wide variety of types of cargo ranging from building materials to recreational equipment. Prior art pick-up truck beds are formed as sheet metal stampings that are assembled over crossbars and beams that are in-turn assembled to the frame and chassis of the truck. Sheet metal parts are generally limited to the thickness of the sheet metal blank and are locally thinned when drawn to a desired shape.

Sheet metal is provided at a specified gage thickness that affects the formability limits for a part. Thicker blanks are more robust and resistant to perforation and denting but add to the overall vehicle weight. Formability limits restrict floor bead shapes and depths because exceeding formability limits may result in splits. Aluminum truck beds offer substantial weight savings compared to steel truck beds but are subject to greater formability limits.

The substantial weight savings available with aluminum truck beds is reduced if additional supporting structures are required to support the bed. The weight of supporting crossbars and beams is also part of the overall weight of the truck bed. Generally, thinner gage truck bed floors require more supporting structures and require more assembly operations.

This disclosure is directed to solving the above problems and other problems as summarized below.

SUMMARY

This disclosure relates to a pick-up truck bed that includes a plurality of longitudinally extending extruded aluminum plates that may include an extruded, integral, inverted T-shaped protrusions extending below the lower surface of the plate that is received on an upper surface of a transverse cross-member. The top wall of the bed may be extruded with a greater thickness than the other portions of the extrusion to minimize weight and increase the robustness and resistance to perforation of the top wall.

A flat top wall may be provided that is supported on longitudinally extending beads that are supported on transverse supporting crossbars. Different bead configurations and orientations may be provided depending on design requirements for reinforcement and assembly.

Each plate includes at least one longitudinal edge that is adapted to be interlocked or assembled to a longitudinal edge of an adjacent plate. Longitudinal edges of adjacent plates are complementary in cross-section to facilitate interlocking the plates together.

According to one aspect of this disclosure, a pick-up truck bed is disclosed that comprises a plurality of plates longer in a longitudinal direction than in a transverse direction that are assembled together along longitudinally extending edges to a laterally adjacent one of the plates. The plates each include a plurality of supporting structures longitudinally extending along a length of the plates that support the plates on transversely extending cross-members.

According to another aspect of this disclosure, a truck bed is disclosed that comprises a longitudinally extending left-side plate defining a left wheel housing cutout; a longitudinally extending central plate including first and second complementary interlocking features on opposite longitudinally extending sides; and a longitudinally extending right-side plate defining a right wheel housing cutout. The left-side plate includes a first interlocking feature and the right-side plate includes a second interlocking feature that each receive one of the complementary interlocking features of the central plate.

The supporting structures may be inverted T-shaped protrusions extending below a lower surface of the plates. Alternatively, the supporting structures may be longitudinally extending ribs defining an isosceles trapezoidal space through a length of the ribs.

The longitudinally extending edge of a first one of the plates may include an upper flange that includes a portion of a top surface of the first plate. The longitudinally extending edge of a second one of the plates may include a lower flange that is disposed below the upper flange when the plates are assembled together.

The longitudinally extending edge of a first one of the plates may include a T-shaped protrusion and the longitudinally extending edge of a second one of the plates may define a T-shaped slot that receives the T-shaped protrusion when the plates are assembled together. The T-shaped protrusion may extend downwardly from a longitudinally extending rib, and the T-shaped slot may be defined in an elongated edge block portion formed on the longitudinally extending edge of the second one of the plates. The T-shaped protrusion extends upwardly from a longitudinal edge the first one of the plates, and the T-shaped slot is defined in an elongated upstanding rib formed on the longitudinally extending edge of the second one of the plates. The elongated upstanding rib may be one of a plurality of solid rectilinear ribs provided on a top surface of the plates.

The longitudinally extending edge of a first one of the plates may include an upper flange that includes a portion of a top surface of the first one of the plates and the longitudinally extending edge of a second one of the plates may include a lower flange that is disposed below the upper flange when the plates are assembled together. The lower flange may include an end portion of the flange oriented to abut one side of an longitudinally extending rib defining an isosceles trapezoidal space through a length of the ribs. At least one fastener may be inserted through the end portion of the flange and the one side of the longitudinally extending rib.

The above aspects of this disclosure and other aspects will be described below with reference to the attached drawings.

BRIEF DESCRIPTION OF THE DRAWINGS

FIG. 3 is a fragmentary perspective view partially in cross-section of a truck bed made according to a second embodiment of this disclosure.

FIG. 4 is a fragmentary cross-sectional view of the truck bed shown in FIG. 3.

FIG. 6 is a fragmentary cross-sectional view of the truck bed shown in FIG. 5.

FIG. 7 is a fragmentary cross-sectional view of made according to a fourth embodiment showing a fastener oriented to be inserted into the truck bed.

FIG. 8 is a fragmentary cross-sectional view of the truck bed shown in FIG. 7 with a fastener securing two plates of the truck bed together.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
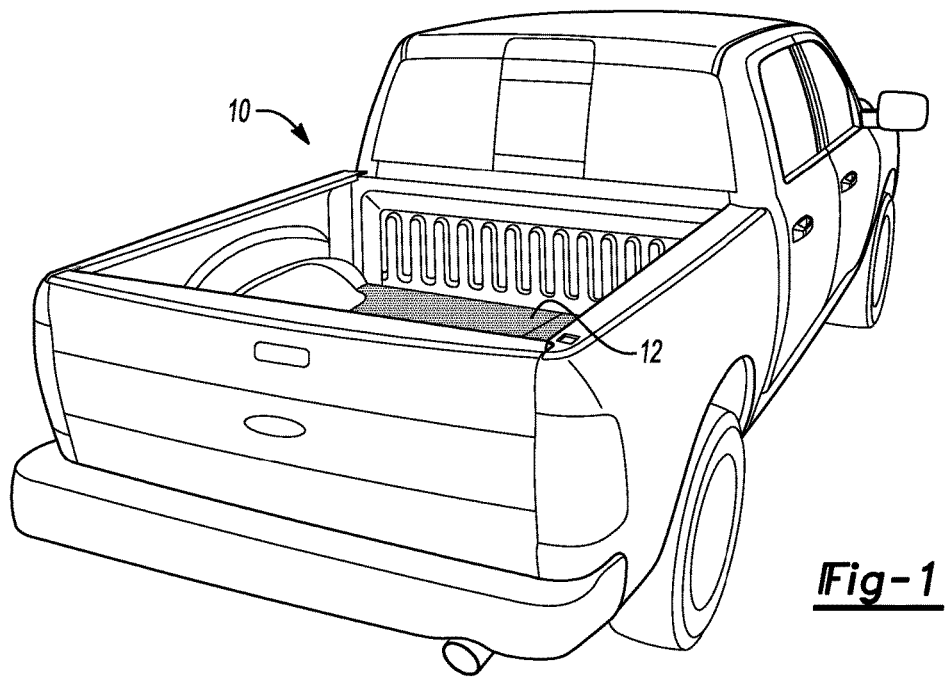
FIG. 1 is a rear/right side perspective view of a pick-up truck with the tailgate closed that includes a truck bed made according to one embodiment of this disclosure.

Referring to FIG. 1, a pick-up truck 10 is shown from a right rear perspective that includes a truck bed 12 made according to this disclosure that includes a extruded deck having increased thickness for preventing perforation of the truck bed 12 or deck.

Figure 2:
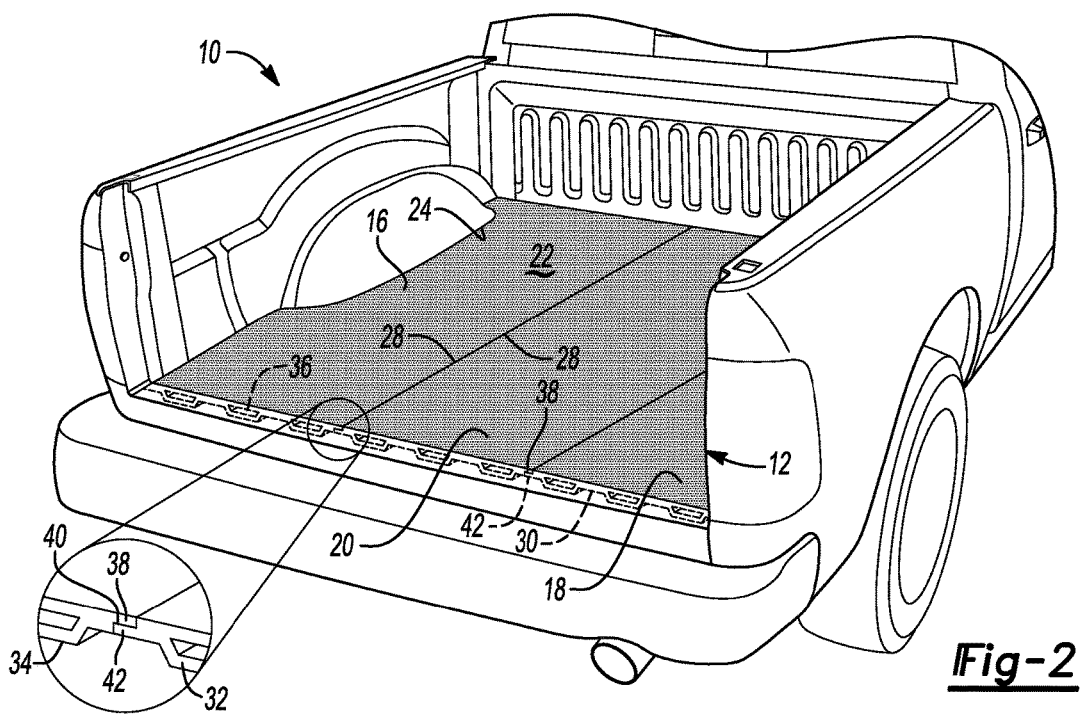
FIG. 2 is a rear/right side perspective view of a pick-up truck with the tailgate open including a truck bed made according to the embodiment shown in FIG. 1.

Referring to FIG. 2, the pick-up truck 10 shown with a truck bed 12 that is formed from three extruded plates. A left-side plate 16, a right-side plate 18 and a central plate 20 are interlocked together to form a smooth deck 22 of the truck bed 12. The left-side plate 16 includes a wheel housing cutout 24 as shown. The right-side plate 18 also includes a wheel housing cutout which is a mirror image of the left side wheel housing cutout 24 but is not visible from the angle shown in FIG. 2. The plates 16-20 each include at least one longitudinal edge 28 that extends in the longitudinal direction.

As used herein, the term "longitudinal" refers to the length of the vehicle and extends in the fore-and-aft vehicle direction. The term "transverse" as used herein, refers to the cross car or lateral vehicle direction.

A plurality of transversely extending cross-members 30 support the truck bed 12. Only the rear-most transversely extending cross-member 30 is shown in FIG. 2; however, it should be understood that other transversely cross-members 30 are provided at spaced longitudinal intervals below the truck bed 12.

A plurality of ribs 32 are provided below each of the plates 16-20. The ribs 32 are formed on a lower surface 34 of the deck 22. The ribs 32 define an isosceles trapezoid shaped opening 36.

An upper flange 38 is provided at the longitudinal edge 28 of the left-side plate 16. The upper flange 38 includes a portion of the top surface 40 of the deck 22. A lower flange 42 is provided on the central plate 20 that supports the upper flange 38 of the left-side plate 16. On the right side of the central plate 20, an upper flange 38 is provided that is supported by a lower flange 42 of the right-side plate 18. The upper flange 38 and lower flange 42 are complimentary interlocking features formed in the extrusion process that are assembled together to form an interlocked extruded truck bed.

Referring to FIGS. 3 and 4, an alternative embodiment of a truck bed 50 is illustrated that is supported on a plurality of inverted T-shaped protrusions that extend from a lower surface 54 of the truck bed 5,0 or deck. A plurality of cross-members are provided below the truck bed 50. The inverted T-shaped protrusions 52 support the truck bed 50 on the cross-member 30.

A plurality of ribs 58 are provided on the top of the truck bed 50. The ribs 58 define an isosceles trapezoid shaped opening 60. The rib 58 at the longitudinal edge 28 of one of the plates the left-side plate 16 includes a top wall 62 of a partial rib 58.

An inverted T-shaped interlocking member 64 extends below the top wall 62 and is received in a complimentary inverted T-shaped interlocking slot 66 of the central plate 20. The complimentary inverted T-shaped interlocking slot 66 is defined by a block portion 68 that is provided on a longitudinal edge 28 of the central plate 20. The inverted T-shaped interlocking member 64 and complimentary inverted T-shaped interlocking slot 66 are formed in the extrusion process to provide a continuous interlock joint between the left-side plate 16 and central plate 20. A similar complimentary interlocking structure is also provided between the right-side plate 18 and central plate 20.

Figure 5:
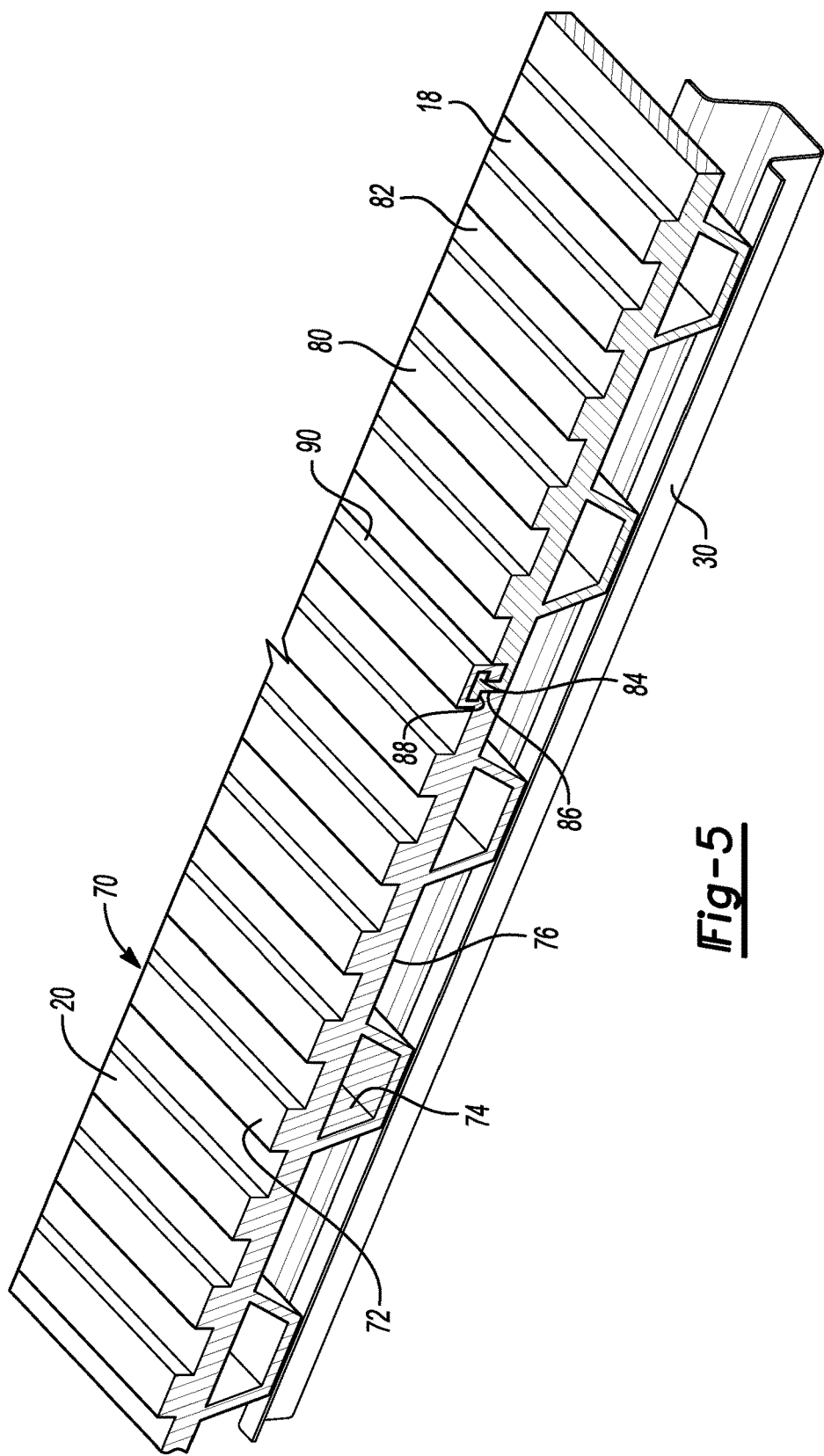
FIG. 5 is a fragmentary perspective view partially in cross-section of a truck bed made according to a third embodiment of this disclosure.

Referring to FIGS. 5 and 6, an alternative embodiment of a truck bed 70 is shown that includes a plurality of ribs 72. The ribs 72 define an isosceles trapezoid shaped opening 74 that extend longitudinally along the truck bed 70. A lower surface 76 of the rib 72 is supported on a cross-member 30. A plurality of cross-members 30 support the truck bed 70 and are longitudinally spaced apart beneath the truck bed 70.

A plurality of solid rectangular ribs 80 are provided on the top surface 82 of the truck bed 70. The solid rectangular ribs 80 and top surface 82 have a thick cross section to resist any potential for penetration of the truck bed 70. The solid rectangular ribs 80 and top surface 82 form a deck of the truck bed 70.

A T-shaped protrusion 84 is provided adjacent a longitudinally extending edge 86 of a right-side plate 18. A complimentary longitudinally extending T-shaped slot 88 is provided near or adjacent a longitudinally extending edge 90 of the central plate 20. The T-shaped protrusion 84 is received in the longitudinally T-shaped slot 88 in a complimentary fashion to provide a continuous extruded interlocking joint between the right-side plate 18 and the central plate 20.

Referring to FIGS. 7 and 8, another alternative embodiment of a truck bed 100, or deck, is shown that is supported a plurality of ribs 102. The ribs 102 define isosceles trapezoid shaped openings 104. The ribs 102 extend below a lower surface 106 of the truck bed 100. The ribs 102 include a base wall 108 and converging side walls 110 that extend from the base wall 108 to the truck bed 100.

The left-side plate 16 includes a top edge flange 112. The central plate 20 has a top surface 114 that engages the top edge flange 112 and supports the top edge 112. The top surface 114 extends below the top edge flange 112. The lower edge flange 116 includes a supporting portion 118 that extends to angularly oriented portion 120. The angularly oriented portion 120 is disposed parallel to one of the converging side walls 110. A fastener 122, such as a flow drill screw, is driven through the angularly oriented portion 120 and into the converging side wall 110 to secure the left-side plate 16 to the central plate 20.

The method of assembling the truck bed 12 to a pick-up truck 10 for each of the embodiments shown in FIGS. 2-8 is similar in that the left-side plate 16 and right-side plate 18 are assembled to the central plate 20 along their longitudinal edges 28. Complimentary interlocking features are provided along the longitudinal edges 28. The plates 16-20 are extruded and as a result have a continuous cross-section in transverse cross-section. The plates 16-20 may be formed in the same extrusion die or identical extrusion dies. The left-side plate 16 and right-side plate 18 are trimmed after being extruded to define a wheel housing cut out 24 on their outer longitudinal edges 28. The interlocking features on the outer longitudinal edges 28 may be either trimmed from the outer longitudinal edges 28 of the left-side plate 16 and right-side plate 18, or may be left intact and used to facilitate joining the truck bed 12 to the side walls of the pick-up truck 10. The plates 16-20 are assembled together as a unitary truck bed 12 that defines a deck 22. The deck 22 is preferably thicker than the supporting structures of the truck bed so that the deck has increased resistance to perforation. The openings defined by the ribs of the supporting structure are provided to reduce the total weight of the truck bed 12.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pick-up truck bed comprising:
   a plurality of elongated plates assembled together along longitudinally extending edges to a laterally adjacent one of the plates, wherein the plates each include a plurality of supporting structures longitudinally extending along a length of the plates that support the plates on transversely extending cross-members, wherein the supporting structures are longitudinally extending ribs defining a closed isosceles trapezoidal space through a length of the ribs, wherein the longitudinally extending edge of a first one of the plates includes an upper flange that includes a portion of a top surface of the first one of the plates and the longitudinally extending edge of a second one of the plates includes a lower flange that is disposed below the upper flange when the plates are assembled together, the lower flange including an end portion of the flange oriented to abut one side of an longitudinally extending rib defining the closed isosceles trapezoidal space through a length of the ribs.

2. The pick-up truck bed of claim 1 wherein at least one fastener is inserted through the end portion of the flange and the one side of the longitudinally extending rib and into the closed isosceles trapezoidal space.

3. A truck bed comprising:
   a longitudinally extending left side plate defining a left wheel housing cutout;
   a plurality of longitudinally extending central plates including first and second complementary interlocking features on opposite longitudinally extending sides; and
   a longitudinally extending right-side plate defining a right wheel housing cutout, wherein the left-side plate includes a first interlocking feature and the right-side plate includes a second interlocking feature that receive one of the complementary interlocking features of one of the central plates; and
   a plurality of supporting structures provided on lower surfaces of the left-side plate, central plates, and the right-side plate, wherein the supporting structures are longitudinally extending ribs defining a closed isosceles trapezoidal space through a length of the ribs, wherein the first complementary interlocking feature includes an upper flange that includes a portion of a top surface of the first plate and the second complementary interlocking feature includes a lower flange that is disposed below the upper flange when the plates are assembled together, the lower flange including an end portion of the flange oriented to abut one side of an longitudinally extending rib defining the closed isosceles trapezoidal space through a length of the ribs.

4. The truck bed of claim 3 wherein the first complementary interlocking feature and the first interlocking feature include an upper flange that includes a portion of a top surface of the first plate and the second complementary interlocking feature and the second interlocking feature include a lower flange that is disposed below the upper flange when the plates are assembled together.

5. The truck bed of claim 3 wherein at least one fastener is inserted through the end portion of the flange and the one side of the longitudinally extending rib.

* * * * *